Aug. 5, 1924.

L. POLL

CELERY PLANTER

Filed Oct. 4, 1922

Inventor
Louis Poll
By
Attorney

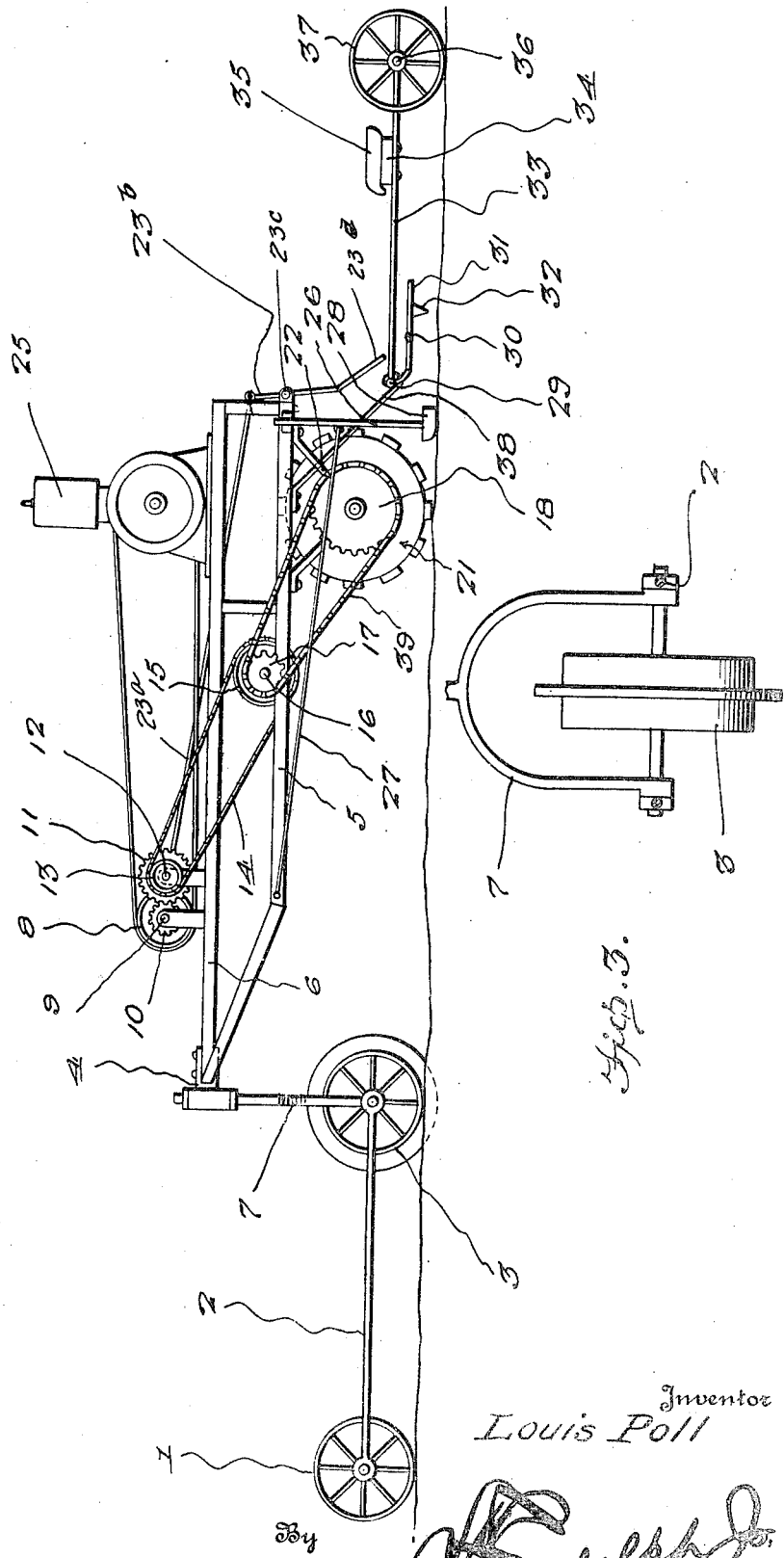

Patented Aug. 5, 1924.

1,504,140

UNITED STATES PATENT OFFICE.

LOUIS POLL, OF HAMILTON, MICHIGAN, ASSIGNOR OF ONE-HALF TO ALEX BLENC, OF HAMILTON, MICHIGAN.

CELERY PLANTER.

Application filed October 4, 1922. Serial No. 592,311.

*To all whom it may concern:*

Be it known that I, LOUIS POLL, a citizen of the United States, residing at Hamilton, in the county of Allegan and State of Michigan, have invented certain new and useful Improvements in Celery Planters; and I do hereby declare the following to be a full, clear, and exact description of the invention, such as will enable others skilled in the art to which it appertains to make and use the same.

The invention has relation to an implement whereby to facilitate the setting of celery plants and to enable the work to be performed with dispatch and with a minimum amount of fatigue and exertion and to insure the planting being effected in straight rows, which is essential to subsequent cultivation and a covering of the stalks as the plants mature and develop.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 2 is a side view thereof, and

Figure 3 is a detail view of the rear roller of the pilot or steering frame.

Corresponding and like parts are referred to in the following description and designated in the several views of the drawings by like reference characters.

Figure 1:
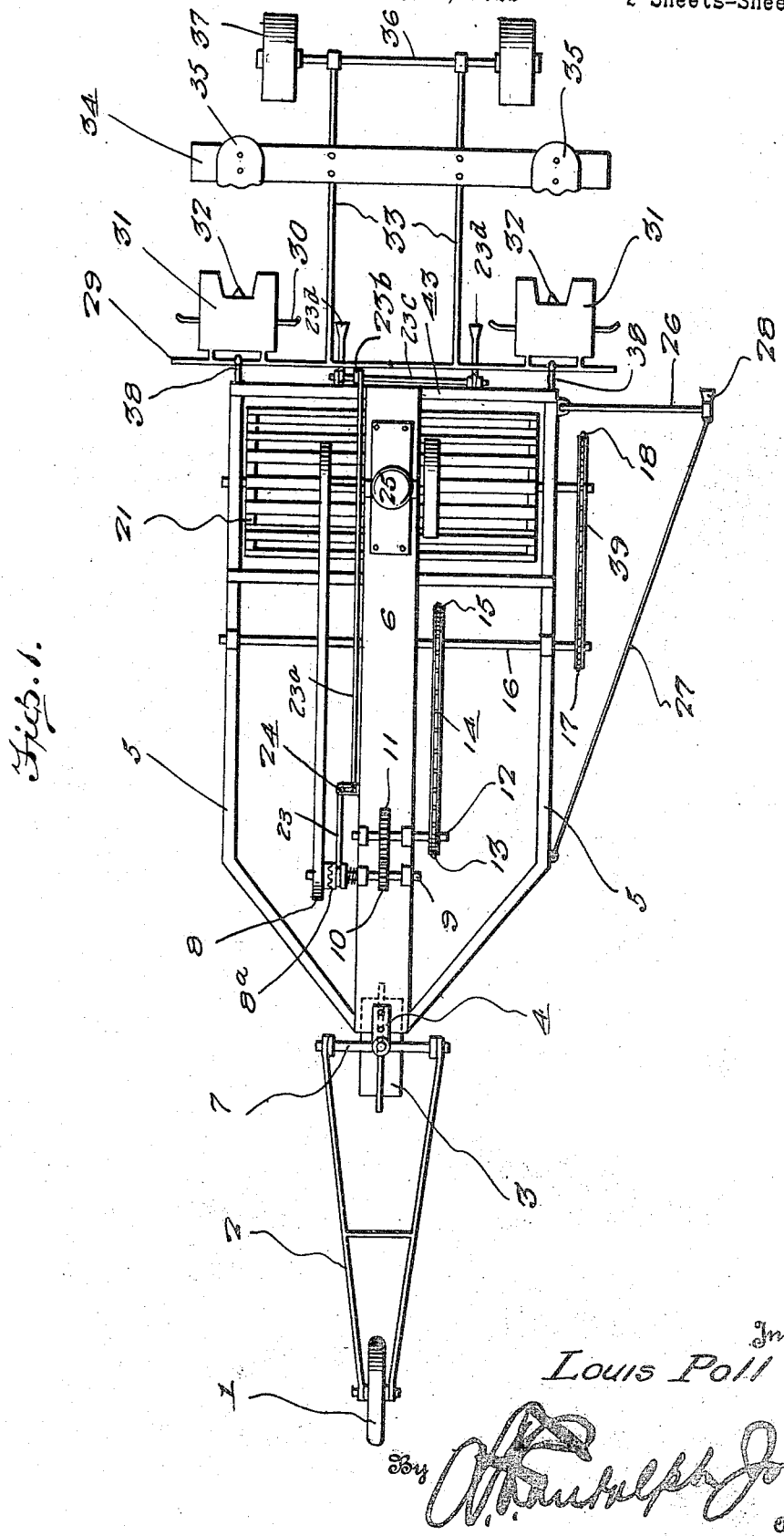
Figure 1 is a top plan view of a celery planter embodying the invention.

The implement comprises essentially a pilot or steering frame, a main frame and a planter and riding frame. The pilot or steering frame comprises a front wheel 1, side bars 2 and a rear roller 3. An arch 7 spans the roller 3 and receives the journals thereof.

The main frame comprises a plate or board 6, side bars 5 having their front ends inclined inwardly and attached to the plate 6, a rear crossbar 43 and a rear roller 21 journaled in brackets 22 depending from the rear ends of the side bars 5. A bracket 4 at the front end of the plate 6 has the arch 7 pivoted thereto, whereby to admit of the pilot or steering frame swinging laterally to admit of the device turning at the end of a row prior to recrossing the field. Shafts 9 and 12 are mounted upon the part 6 and are connected by gearing 10 and 11. An engine 25 of any approved type is mounted upon the rear portion of the part 6 and is belted or otherwise connected to the shaft 9 to impart movement thereto. A pulley 8 loose on the shaft 9 is adapted to be clutched thereto by means of a clutch member 8ª splined on the shaft 9 and shiftable by means of a lever 23 whereby the pulley 8 may be thrown into or out of gear as required. The lever 23 is of the form of a bell crank and fulcrumed at 24. A rod 23ª connects an arm of the lever 23 with an arm 23ᵇ projecting from a shaft 23ᶜ mounted on the rear of the planter frame. Foot levers 23ᵈ are attached to the shaft 23ᶜ and are conveniently disposed for operation to admit of throwing the machine into and out of gear at will while leaving the hands free.

A shaft 16, mounted on the main frame, is provided with a pulley 15 which is connected by means of a drive chain 14 with a pulley 13 fast to the shaft 12. A sprocket wheel 17 fast to the outer end of the shaft 16, is connected by means of a sprocket chain 39 with a sprocket wheel 18 fast to the axle of the roller 21. In this manner, the implement is slowly propelled over the field. A marker 28 is carried by the main frame and is attached to the outer end of a bar 26 which is pivoted at its inner end to the frame. A stay 27 connects the outer end of the bar 26 with the front portion of the main frame. The marker 28 may be of any construction so as to form a furrow in which the pilot wheel 1 may run on the succeeding trip of the machine so as to properly steer the implement when moving across the field and thereby insure the setting of the plants in a straight row.

The planter and riding frame comprise a crossbar 29, spaced longitudinal bars 33 and an axle 36 provided with ground wheels 37. Draft bars 38 connected to the main frame and depending therefrom detachably engage the riding frame and are hooked at their lower ends to receive the cross bar 29. Platforms 31 are connected to opposite ends of the cross bar 29 and are adapted to ride upon the ground. The platforms 31 are adapted to receive and support the celery plants to be planted and which are contained in a box or other receptacle. Bars 30 attached to the platforms 31 project at opposite ends to form foot rests. The rear portion of each platform 31 is cut away and receives a foot 32 whereby to form a furrow for the reception of the plants. A crosspiece 34 attached to the longitudinal bars 33 projects beyond the latter and receive seats 35 upon which the operators are mounted for setting the plants. The implement disclosed enables the planting of two rows at one time, the plants of each row being set by an attendant mounted upon a seat 35 with the feet resting upon the projecting ends of the cross bars 30. The plants are set in the furrows formed by the feet 32, the soil being gathered about the roots of the plants as the latter are set. The slow movement of the implement admits of the setting of the plants and the covering of the roots thereof.

What is claimed is:

1. In an implement of the character specified, a plant-supporting platform, a furrow opening means depending therefrom, a seat in the rear of said platform, and foot rests for the occupant of said seat carried by said platform.

2. An implement of the character specified comprising a pivotally mounted plant-supporting platform adapted to ride upon the ground, said platform having extensions providing foot rests, and a cross piece provided with a seat in the rear of the platform for the attendant.

In testmony whereof I affix my signature in presence of two witnesses.

LOUIS POLL.

Witnesses:
 HERMAN BROWER,
 JULIET H. SCHUTMAAT.